United States Patent
Margon

(10) Patent No.: US 9,232,379 B2
(45) Date of Patent: Jan. 5, 2016

(54) NOTIFICATION SYSTEM USING A DUPLICATE START RECORD

(71) Applicant: Kenneth Margon, Selangor (MY)

(72) Inventor: Kenneth Margon, Selangor (MY)

( * ) Notice: Subject to any disclaimer, the term of this patent is extended or adjusted under 35 U.S.C. 154(b) by 41 days.

(21) Appl. No.: 14/069,300

(22) Filed: Oct. 31, 2013

(65) Prior Publication Data

US 2015/0118989 A1    Apr. 30, 2015

(51) Int. Cl.
*H04W 4/22* (2009.01)
*G08B 25/01* (2006.01)
*H04W 76/00* (2009.01)
*H04W 4/02* (2009.01)

(52) U.S. Cl.
CPC .............. *H04W 4/22* (2013.01); *G08B 25/016* (2013.01); *H04M 2242/04* (2013.01); *H04W 4/02* (2013.01); *H04W 76/007* (2013.01)

(58) Field of Classification Search
None
See application file for complete search history.

(56) References Cited

U.S. PATENT DOCUMENTS

| | | | | |
|---|---|---|---|---|
| 5,563,931 A * | 10/1996 | Bishop et al. | ............... | 455/404.1 |
| 5,742,666 A * | 4/1998 | Alpert | ................. | 455/404.2 |
| 8,249,547 B1 * | 8/2012 | Fellner | .................. | 455/404.1 |
| 8,868,616 B1 * | 10/2014 | Otto et al. | ................. | 707/802 |
| 2004/0014478 A1 * | 1/2004 | Hoffman et al. | ........... | 455/456.1 |
| 2004/0127189 A1 * | 7/2004 | Olivier et al. | ................. | 455/350 |
| 2004/0198314 A1 * | 10/2004 | Pardue | ........................ | 455/404.1 |
| 2004/0224701 A1 * | 11/2004 | Lewis-Evans et al. | ..... | 455/456.2 |
| 2005/0088999 A1 * | 4/2005 | Waylett et al. | ................. | 370/338 |
| 2005/0197096 A1 * | 9/2005 | Yang et al. | ................. | 455/404.1 |
| 2006/0073806 A1 * | 4/2006 | Jenkins | ...................... | 455/404.1 |
| 2007/0254624 A1 * | 11/2007 | Le Creff et al. | ............. | 455/404.1 |
| 2008/0311881 A1 * | 12/2008 | Taaghol et al. | ............. | 455/404.2 |
| 2009/0137224 A1 * | 5/2009 | Peyre et al. | ................. | 455/404.2 |
| 2009/0181638 A1 * | 7/2009 | Gottlieb | ...................... | 455/404.1 |
| 2009/0318109 A1 * | 12/2009 | Kroselberg et al. | ......... | 455/404.1 |
| 2009/0322513 A1 * | 12/2009 | Hwang et al. | ............. | 340/539.12 |
| 2010/0066558 A1 * | 3/2010 | McCauley | ............... | 340/825.49 |
| 2010/0156626 A1 * | 6/2010 | Story | ....................... | 340/539.13 |
| 2010/0194631 A1 * | 8/2010 | Janetis et al. | ............... | 342/357.1 |
| 2010/0210323 A1 * | 8/2010 | Collins et al. | ............... | 455/575.1 |
| 2010/0285771 A1 * | 11/2010 | Peabody | ..................... | 455/404.2 |
| 2010/0317316 A1 * | 12/2010 | Lalos | ......................... | 455/404.2 |
| 2011/0003601 A1 * | 1/2011 | Coutts et al. | ................ | 455/456.1 |
| 2011/0045797 A1 * | 2/2011 | Fee | ............................ | 455/404.2 |
| 2011/0195686 A1 * | 8/2011 | Darling | ...................... | 455/404.1 |
| 2012/0083237 A1 * | 4/2012 | Fish et al. | ................... | 455/404.1 |
| 2012/0108196 A1 * | 5/2012 | Musgrove et al. | ......... | 455/404.1 |
| 2012/0258682 A1 * | 10/2012 | Jang et al. | .................. | 455/404.2 |
| 2013/0078942 A1 * | 3/2013 | Owens et al. | ............... | 455/404.2 |
| 2013/0109342 A1 * | 5/2013 | Welch | ........................ | 455/404.2 |
| 2013/0122849 A1 * | 5/2013 | Doezema et al. | ........... | 455/404.1 |
| 2013/0281046 A1 * | 10/2013 | Sennett et al. | ............. | 455/404.1 |
| 2014/0080545 A1 * | 3/2014 | Ledingham et al. | .......... | 455/564 |
| 2014/0171152 A1 * | 6/2014 | Dempsey | ...................... | 455/564 |

* cited by examiner

*Primary Examiner* — King Poon
*Assistant Examiner* — Vincent Peren
(74) *Attorney, Agent, or Firm* — San Diego IP Law Group LLP

(57) ABSTRACT

The present invention provides a technique for notifying a call center of an alert and providing access to a notification server which contains precompiled database information of a desired action to take in response to the alert. The alert is provided through a radius start record from a pendant with the user. The pendant remains turned off, until activated by the user. After activated, a modem of the pendant registers the pendant with a cellular network and in parallel, the cellular network provides a duplicate radius start record to a group of servers, which means there must be an alert from the user, such as an emergency.

10 Claims, 4 Drawing Sheets

NOTIFICATION SYSTEM USING A DUPLICATE START RECORD

BACKGROUND OF THE INVENTION

1. Field of Invention

The present invention relates to a cellular radius start record, and more specifically, to a notification system using a duplicate of the cellular radius start record to represent an alert.

2. Description of Related Art

Remote access dial in user service ("radius") is a commonly used networking protocol that provides centralized authentication, authorization, and accounting for management of multiple computers that connect and use a network service. Radius is often used by internet service providers to manage access points to the Internet, internal networks, wireless networks, and email services.

Radius includes a server, called the radius server, which communicates with gateways such as a remote access server (RAS), a virtual private network (VPN) server, a network switch, and a network access server (NAS). The radius server is seemingly everywhere, as it runs as a background process on a UNIX and Microsoft Window servers.

In the accounting feature of radius, there are many records. For the "start" record, after the NAS grants access to a user, an accounting radius start record is generated. The radius start record is sent from the NAS to the radius server to signal the start of the user's network access. Radius start records typically contain the user's identification, network address, point of attachment, and a unique session identifier.

When the user's network access is closed, the NAS issues an accounting stop record to the radius server providing information on the final usage in terms of time, packets transferred, data transferred, reason for disconnect, and other information related to the user's network access. The accounting records can be used for billing and statistical purposes.

Another technology is alert notifications. Alert notifications provide messages between individuals or groups in one way or two way communication. One type of alert notifications is an emergency alert. An emergency alert may contact the police, the fire department, or an emergency medical service such as an ambulance.

A problem with conventional alert notifications, in the emergency context, is the amount of time that it takes to make a connection and to convey information regarding the alert. For example, when a cellular telephone is used to call for emergency services, delays include, for example, the time for cell phone service to become available, the time taken to dial a number, the time while the phone rings, any cellular disconnects when a cell phone drops coverage, or the time to explain that emergency services are needed. In some situations, time is of essence to convey a message regarding what actions to take. Examples of time sensitive situations include when a user has shortness of breath, dizziness which could lead to fainting, choking, a pending heart attack, a home invasion, etc.

Another problem is that the alert is not specific to the user or the user's situation. The alert does not inform the person receiving the alert to take a particular action, which may take more time or resources to convey than possible. For example, even assuming the user gets a hold of an operator and lets them know there is an emergency, the operator knows little else about the user. The operator does not know the identity the person having the emergency, any relevant prior medical history, why the person has an alert notification system, the likely extent of the emergency, the desired response, medical providers, emergency contacts, and any other precompiled and stored database information.

One conventional notification device, by LifeCall, provides a pendant which, when activated, allows a user to speak into an audio receiving device and talk directly with a dispatch service without the need to reach a telephone. This conventional device is ideal for senior citizens and the disabled and became extremely well known in popular culture due to a commercial featuring an elderly woman stating that she had fallen, but could not get up.

However, the LifeCall pendant falls short because the pendant is simply a phone dialer, and does not use cellular. Also, until the operator receives the call, which is the time for a phone call to go through (e.g., 10-15 seconds), the operator does not know who is calling. Additionally, the operator does not receive any precompiled information that would indicate what action to take prior to hearing the user's voice.

SUMMARY OF THE INVENTION

The present invention provides a technique for notifying a call center of an alert and providing access to a notification server which contains precompiled database information of a desired action to take in response to the alert. The alert is provided through a radius start record from a pendant with the user. The pendant remains turned off, until activated by the user. After activated, a modem of the pendant registers the pendant with a cellular network and in parallel, the cellular network provides a duplicate radius start record to a group of servers, which means there must be an alert from the user, such as an emergency.

In one embodiment, a system comprises: a cellular network; a pendant having a modem configured to register to the cellular network when the pendant is activated, wherein the pendant is activated by turning the pendant on, wherein the activation makes the cellular network generate a radius start record and a duplicate radius start record, wherein the duplicate radius start record matches the radius start record; a radius server configured to receive the duplicate radius start record, wherein the receipt of the duplicate radius start record by the radius server is indicative of an alert; and a web server configured to receive a message from the radius server after the radius server receives the duplicate radius start record, the web server in communication with a call center, wherein the web server transmits the alert to the call center. The pendant may be part of a necklace and may have a push button, a touch sensor, or fall detection for activation. The alert may comprise an emergency alert. The radius start record may be sent to a wireless communication company. The notification server may comprise precompiled database information related to a user. The call center may contact a tenant.

In another embodiment, a group of servers comprises: a radius server configured to receive a duplicate radius start record from a cellular network, wherein the receipt of the duplicate radius start record by the radius server is indicative of an alert from a pendant having a modem configured to register to the cellular network when the pendant is activated, wherein the pendant is activated by turning the pendant on, wherein the activation makes the cellular network generate a radius start record and a duplicate radius start record, wherein the duplicate radius start record matches the radius start record; and a web server configured to receive a message from the radius server after the radius server receives the duplicate radius start record, the web server in communication with a call center, wherein the web server transmits the alert to the call center.

In a further embodiment, a system comprises: a radio network; a pendant having a radio configured to register to the radio network when the pendant is activated, wherein the pendant is activated by turning the pendant on, wherein the activation makes the radio network generate a start record and a duplicate start record, wherein the duplicate radius start record matches the radius start record; a radius server configured to receive the duplicate radius start record, wherein the receipt of the duplicate start record by the radius server is indicative of an alert; and a web server configured to receive a message from the radius server after the radius server receives the duplicate start record, the web server in communication with a call center, wherein the web server transmits the alert to the call center.

An advantage is that the pendant has very long battery life compared to a conventional wireless alert device because the pendant is turned completely off until there is an alert. A conventional cellular wireless device uses significant battery life, even in standby mode (i.e., registered to the network), because a conventional cellular wireless device will always know where it is, unlike the pendant, which does not know where it is until the modem of the pendant is activated. Although a phone may be registered to a save our ship (SOS) network, turning a conventional phone on does nothing to indicate an alert, unlike the pendant.

Additionally, a conventional wireless device has many other battery hungry applications (e.g., a screen, seeking connection to wireless networks, seeking for updates to applications, searching for new emails, etc.). In contrast, the pendant can have a battery life that last one to three years, compared to a conventional wireless device which last about a day. The pendant can be without a screen and is normally turned completely off, except when fall detection is used. When fall detection is used, some battery life is being used, although the pendant's modem is still turned off.

Another advantage is the additional information that may be provided with the alert. Although just the receipt of a radius signal is sufficient to indicate that there is an alert, embodiments of the present invention go further, and provide additional information such as the particular action to take in response to the alert. The information can also include the identity of the user having the emergency, relevant prior medical history, why the person has an alert notification system, the likely extent of the emergency, the desired response, medical providers, emergency contacts, and any other stored database information.

A further advantage of the invention, is that it is a faster way to contact emergency services. The invention provides a timing savings that can be critical during certain situations such as a heart attack or choking. During a time sensitive situation, the user would not want to spend the time obtaining cell phone service, dialing a number, waiting while the phone rings, having any cellular phone disconnects, explaining to the operator that emergency services is needed, or telling the operator what specific action should be taken. This would also be beneficial if the user is from another country and does not speak the same language as the operator, if there is no data available, if the system is overwhelmed during an emergency since voice connection does not needs to be made to indicate that there is an alert.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF EMBODIMENTS

Figure 1:
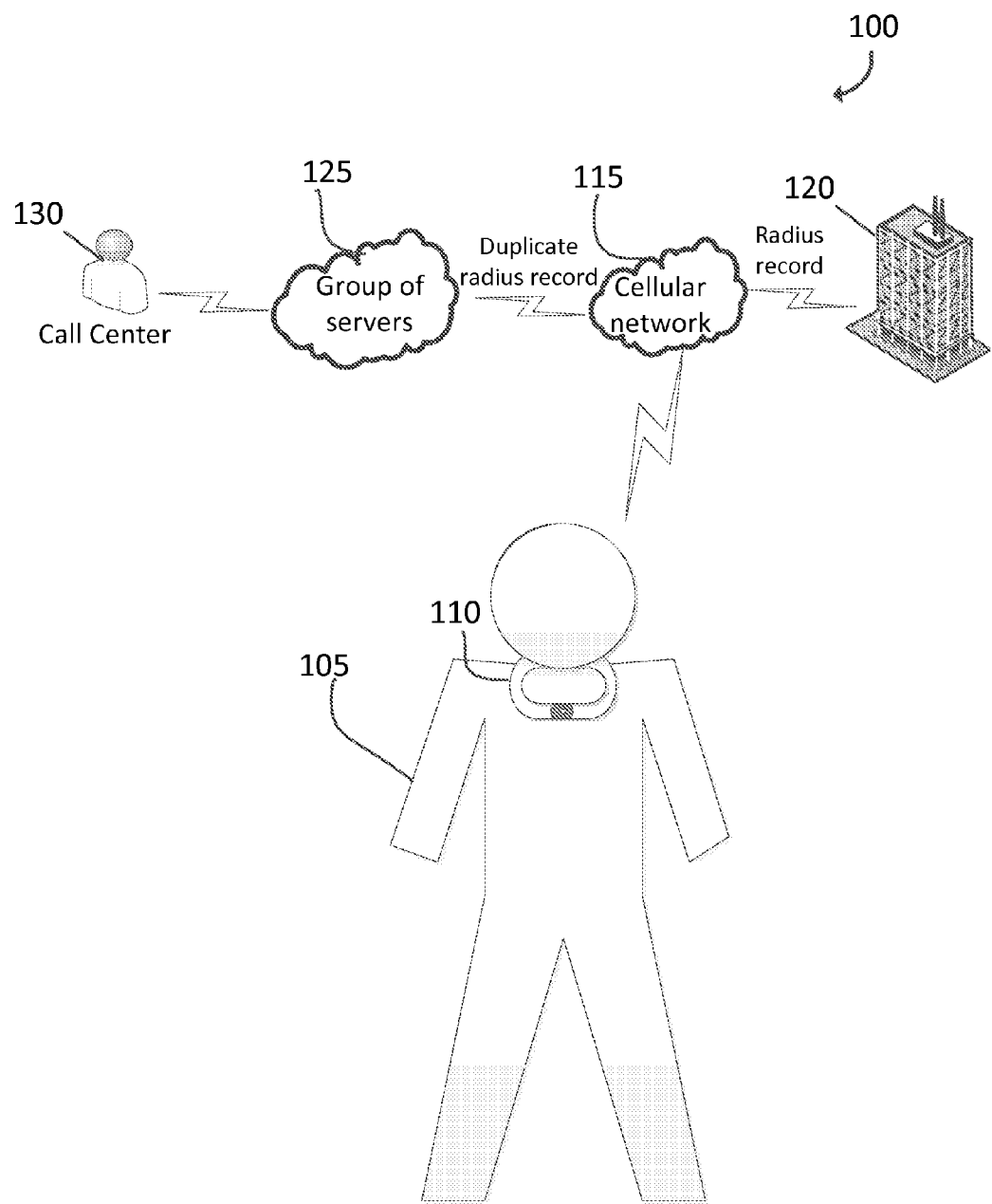
FIG. 1 illustrates a notification system according to an embodiment of the invention.

Further features and advantages of the invention, as well as the structure and operation of various embodiments of the invention, are described in detail below with reference to the accompanying FIGS. 1-5, wherein like reference numerals refer to like elements.

Although the present invention is described in the emergency health context, one of ordinary skill in the art readily appreciates that the present invention is applicable outside the health context, without departing from the spirit of the invention, such as being indicative of a broken water pipe or a seismograph for earthquake notification, which only turn on in the case of emergencies. The present invention also applies to non-emergencies, such as the pendant being activated to call a family member because the user would like to go shopping for groceries or the family dog escaped the backyard and is with a neighbor. Additionally, although the present invention is described in terms of contacting an operator at a call center, one of ordinary skill in the art could apply this to other applicable people such as a family member or a medical professional.

In an exemplary embodiment of the invention, a save our ship (SOS) pendant is started. Then, a cellular modem in the pendant is turned on. The cellular modem connects to a network, such as a Global System for Mobile Communications (GSM) network. Next, a radius accounting record is generated, where the radius accounting record can be used to trigger an alarm at a call center. In response to the alarm, an operator at the call center picks up a phone and takes an action based on information precompiled by the user, the user's family, or the user's medical providers. In one embodiment, the action taken is to instantly connect the operator to the user through voice over Internet Protocol (VOIP), without multiple rings. If the user cannot speak, then emergency action is taken. In another embodiment, known as a non-voice alert such as in the case of fall detection, emergency action is automatically taken such as calling a nurse or texting a family member in the same home.

In another embodiment, after the radius record is generated, instead of triggering an alarm at the call center, the cellular modem establishes a data connection. Then, the cellular modem obtains an Internet Protocol (IP) address, Session Initiation Protocol (SIP) VOIP comes up, such that the operator at the call center can make a voice call without multiple rings. Again, if the user cannot speak, then emergency action is taken.

In a further embodiment, after the radius record is generated, the cellular modem establishes an Assisted Global Positioning System connection, also referred to as A-GPS. A-GPS is a system that can improve the startup performance of a GPS system.

FIG. 1 illustrates a notification system 100 according to an embodiment of the invention. The system 100 includes a user 105, a device 110, a cellular network 115, a wireless communication company 120, a group of servers 125, and a call center 130. The system 100 contains an alert that notifies the call center 130 to take one or more actions.

The user 105 (e.g., pendant user) can be an elderly person, a medical patient, a pet, or anyone or anything who could benefit from either the timing savings, additional information provided with the alert, or battery life savings. For example, the alert can inform the call center 130 to take a particular action, which may take more time or resources to convey without the alert.

The device 110 (e.g., pendant, pendant device, etc.) comprises a modem that is configured to register with a cellular network. The modem is turned off until activated by an alert. When the device receives an indication that an alert should be transmitted, the device 110 then transmits the alert. The alert is provided through a radius start record activated by the user pressing a push-button or another form of activation such as a touch sensor to pass on the alert. A radius start record, as is known conventionally, is part of the accounting portion of the radius network protocol.

Although the device 110 is illustrated as having a push button to activate the device 110, one of ordinary skill in the art readily appreciates that the present invention is applicable to any means for receiving an indication of an alert, such as a touch sensor, a panic button, a password, a voice command, fall detection, activity monitoring, etc. Fall detection activates the alert when electronics on the pendant indicates that the user has fallen. Activity detection detects a lack of activity indicative of a problem. The device 110 is described further with respect to FIG. 2.

The cellular network 115 (e.g., AT&T network, a GSM network, cell tower, etc.) is a well-known telecommunications standard to describe protocols for cellular networks used by mobile phones (e.g., second generation 2G digital). Conventionally, the cellular network such as GSM network receives a radius start record and delivers it to a wireless communication company 120. Although the illustrated invention is described in terms of a GSM network, one of ordinary skill in the art could apply this to other applicable communication networks using radius start records.

The wireless communication company 120 (e.g., a mobile carrier, telephone company, AT&T, etc.) uses the information contained within the radius start record signal. This information may include the start of the user's network access, the user's identification, the user's network address, a point of attachment, and a unique session identifier.

The group of servers 125 (e.g., ZMS server, notification server, service delivery platform, etc.) is configured to receive a duplicate copy of the radius start record sent to the wireless communication company 120. In one embodiment, the radius start record and the duplicate radius start record simply state that a particular SIM chip number, is registering along with the start time and date. The servers 125 pass on the alert to the call center 130. Additionally, the servers include a notification server which has precompiled database information that is likely relevant to the alert. The servers 125 are described further with respect to FIG. 3.

The call center 130 (e.g., a caregiver answer server, etc.) receives the alert from the servers. Further, the call center 130 has access to the notification server containing precompiled database information relevant to the alert. Using that relevant information, the call center 130 can take an informed action based on the precompiled information. In another embodiment, instead of contacting an operator at a call center, the servers 125 instead contact a family member or a medical professional.

The call center 130 can be connected to a tenant (not shown), which is a term of art meaning the company authorized to operate the group of servers 125. This connection can be very close, or alternatively, in another portion of the world. The tenant is the person or organization which the call center contacts, such as a hospital or a neighbor. For example, the tenant may receive an alert saying to check a particular patient, in a particular hospital room, who has fallen.

In a simplified embodiment, the network does not need to be a cellular network, but is a more general radio network or just a network. In this embodiment, the start record is not a radius start record, but just a generic start record, sent to a generic server.

Figure 2:
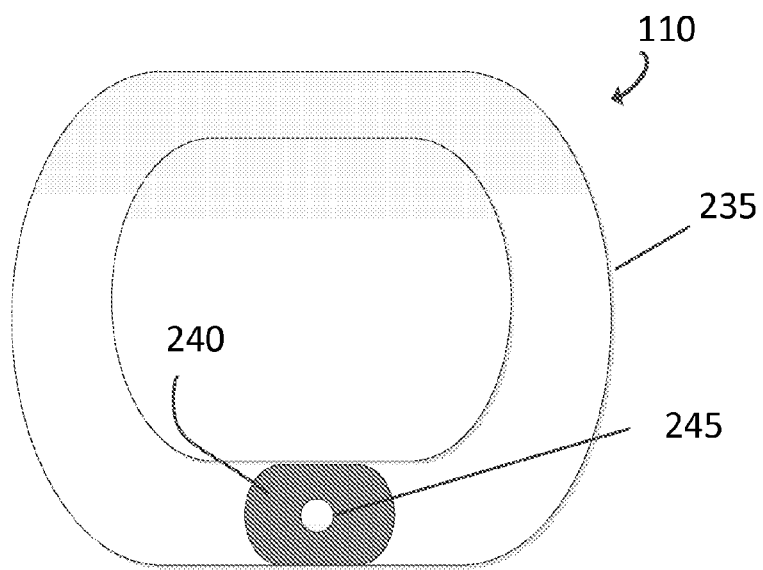
FIG. 2 illustrates a device of the system according to an embodiment of the invention.

FIG. 2 illustrates the device 105 of the system 100 according to an embodiment of the invention. The device 105 has a strap portion 235 and a pendant 240. The strap portion is configured to attach to the user 105. In one embodiment, the pendant 105 is a necklace. In another embodiment, the pendant is a bracelet.

The pendant 240 is configured to receive an indication of an alert through a push button 245 (e.g., panic button). In another embodiment, the pendant 240 is configured to receive an indication of an alert through a touch sensor built into the body of the pendant 240 for activation. The pendant 240 also contains a modem (not shown) to register the pendant 240 with the cellular network 115, which creates a radius start record. The radius start record does not have the particular action to be taken, but can be viewed as being the same as an alert, in that just the receipt of the radius start record by the group of servers 125 means that there is an alert.

A pendant is also described in a related application, U.S. patent application Ser. No. 13/214,156, entitled Physiological Data Acquisition Utilizing Vibrational Identification, and incorporated herein by reference.

Figure 3:
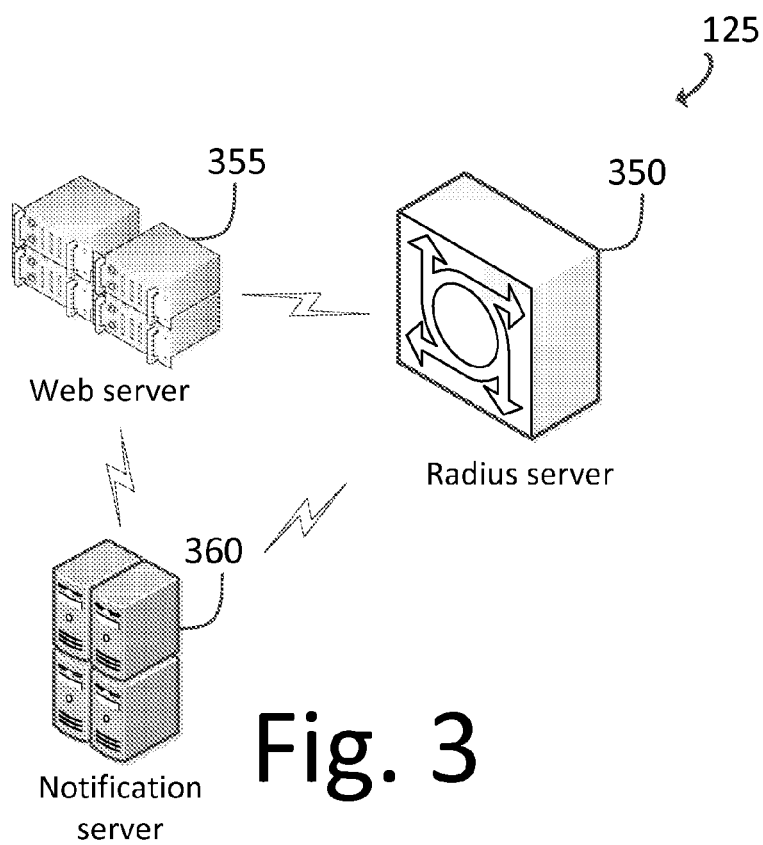
FIG. 3 illustrates a group of servers of the system according to an embodiment of the invention.

FIG. 3 illustrates the servers 125 of the system 100 according to an embodiment of the invention. The servers 125 include a radius server 350, a web server 355, and a notification server 360. The radius server 350 is configured to receive the duplicate radius start record sent from the cellular network 115.

The duplicate radius start record itself does not contain the action(s) to be taken, but instead, notifies the call center who can view the actions. In other words, the radius start record does not convey very much information. However, unlike wireless communication company 120 which normally receives radius start records, when the group of servers 125 receives the duplicate radius start record, which is a red flag because a radius start record would only be received if there is an alert. Also, the group of servers 125 can recognize that the duplicate radius record is not from a telephone since the group of servers 125 is a separate network from that of the wireless communication company 120 and the group of servers 125 do not interact with telephones.

Duplicate radius start records exist for servers of telephone companies, typically used for billing purposes. However, these conventional telephone companies do not use the duplicate radius start record in the same way. Specifically, when the group of servers 125 receive a radius start record, the servers 125 know this is an alert (e.g., an emergency) means that some action needs to be taken. Conventionally servers receive radius records, but this receipt does not indicate an alert or that help is needed.

The web server 355 receives a message from the radius server 350 and notifies the call center of the alert. And like conventional web servers, the web server 355 can provide computer hardware or software. Specifically, the web server 355 can deliver website content through the Internet, host websites, support gaming, provide data storage, or run enterprise applications.

The notification server 360 (e.g., notification database) stores information associated with the pendant 240. The notification server 360 acts as a database, containing precompiled database information relevant to the alert.

The servers 125 can include many other non-illustrated servers, such as a domain name system (DNS) server, a database server, a radius and Network Time Protocol (NTP) server, a Session Initiation Protocol (SIP) and media conversion server, a Technical Report 069 (TR069) and a third-party network server (STUN). The servers 125 are configured to attach to an AT&T server through a Virtual Private Network (VPN) forming a service delivery platform (e.g., ZMS platform).

Figure 4:
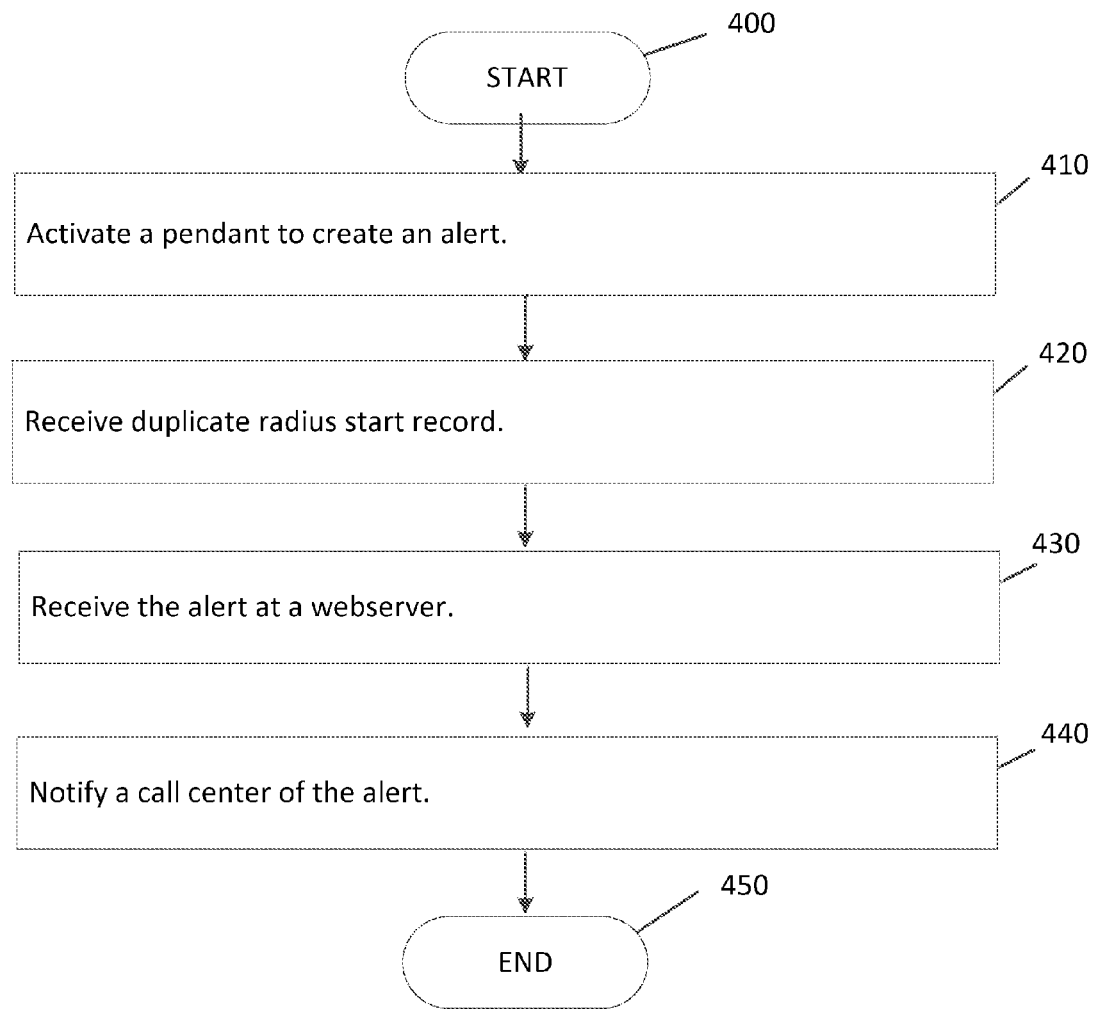
FIG. 4 illustrates a simplified process of notifying a call center of an alert according to an embodiment of the invention.

FIG. 4 illustrates a simplified process of notifying a call center of the alert according to an embodiment of the invention. The process starts at step 400. At step 410, the user 105 or another person activates the pendant 110 to create an alert. The user 105 can activate the pendant 110 by pressing the push button 245. At step 420, the servers 125 receive a duplicate radius start record from the cellular network 115. The duplicate radius start record matches the start record provided to the wireless communication company 120 through the cellular network 115.

At step 430, the web server 355 receives the alert to take an action. At step 440, the web server 355 notifies the call center 130 of the alert. The alert can be an action that should be taken, such as to notify a neighbor, family member, or emergency personnel. The process may be repeated recursively a number of times and ends at step 450.

Figure 5:
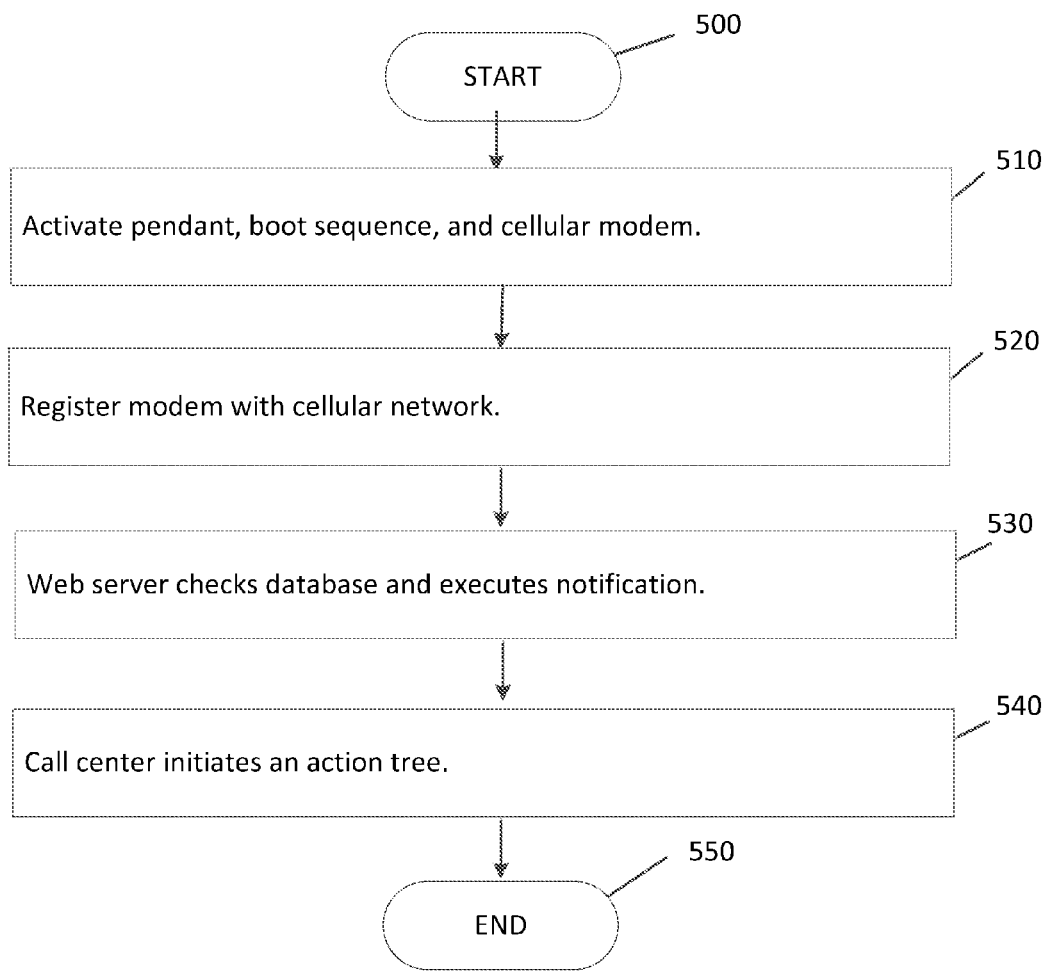
FIG. 5 illustrates a more detailed version of the process of FIG. 4 according to an embodiment of the invention.

FIG. 5 illustrates a more detailed version of the process of FIG. 4 according to an embodiment of the invention. At step 510, the user 105 or another person activates the pendant 110, which activates a boot sequence and a cellular modem.

At step 520, a cellular modem registers with the cellular network 115. While registering, if the modem's credentials are authenticated, the cellular network 115 generates a radius start record. In parallel with the radius start record being generated, the cellular modem registration is being completed by the cellular network 115. Then, a duplicate radius start record is sent to the group of servers 125 by way of the cellular network 115 (and a through VPN or other network, not illustrated). Upon receipt of the duplicate radius start record, the radius server 350 in the group of servers 125, sends a message to the web server 355 in the group of servers 125. Each of these actions in step 520 occur in parallel.

Step 520 provides a time savings (e.g., 15-20 seconds) by using the duplicate record. A conventional call center, or conventional data service of a mobile phone, would not know or need to know anything about a radius record. In contrast, step 520 uses telephone company infrastructure in order to convey information to the call center 130.

At step 530, after the web server 355 receives the message, the web server 355 checks the notification server/database 360 and executes alert notification to the call center 130. At step 540, the call center 130 initiates an action tree. For example, if the operator can talk to a person, the operator should ask the user if they need help, and if the user asks for help, the operator should call whoever the user tells the operator to call. If the user cannot speak to operator (e.g., the user is unconscious), then the operator follows a logic tree of steps, provided ahead of time by the user, such as calling the neighbor first, and if the neighbor does not answer, then calling emergency services for help. The process may be repeated recursively a number of times and ends at step 550.

It is to be recognized that depending on the embodiment, certain acts or events of any of the methods described herein can be performed in a different sequence, may be added, merged, or left out altogether (for example, not all described acts or events are necessary for the practice of the method). Moreover, in certain embodiments, acts or events may be performed concurrently, for example, through multi-threaded processing, interrupt processing, or multiple processors, rather than sequentially.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

What is claimed is:

1. A system comprising:
a cellular network;
a pendant having a modem configured to register to the cellular network when the pendant is activated, wherein the pendant is activated by turning the pendant on, wherein the activation makes the cellular network generate a radius start record and a duplicate radius start record, wherein the duplicate radius start record matches the radius start record;
a radius server configured to receive the duplicate radius start record, wherein the receipt of the duplicate radius start record by the radius server is indicative of an alert; and
a web server configured to receive a message from the radius server after the radius server receives the duplicate radius start record, the web server in communication with a call center, wherein the web server transmits the alert to the call center.

2. The system of claim 1, wherein the pendant is part of a necklace.

3. The system of claim 1, wherein the alert comprises an emergency alert.

4. The system of claim 1, wherein the pendant comprises a push button for activation.

5. The system of claim 1, wherein the pendant comprises a touch sensor built into the body of the pendant for activation.

6. The system of claim 1, wherein the pendant comprises fall detection for activation.

7. The system of claim 1, further comprising the radius start record being sent to a wireless communication company.

8. The system of claim 1, further comprising a notification server, wherein the notification server comprises precompiled database information related to a user.

9. The system of claim 1, wherein the call center contacts a tenant.

10. A group of servers comprising:
a radius server configured to receive a duplicate radius start record from a cellular network, wherein the receipt of the duplicate radius start record by the radius server is indicative of an alert from a pendant having a modem configured to register to the cellular network when the pendant is activated, wherein the pendant is activated by turning the pendant on, wherein the activation makes the cellular network generate a radius start record and a duplicate radius start record, wherein the duplicate radius start record matches the radius start record; and a web server configured to receive a message from the radius server after the radius server receives the duplicate radius start record, the web server in communication with a call center, wherein the web server transmits the alert to the call center.

* * * * *